(12) United States Patent
Scarsdale

(10) Patent No.: US 6,242,829 B1
(45) Date of Patent: Jun. 5, 2001

(54) SUBMERSIBLE PUMPING SYSTEM UTILIZING A MOTOR PROTECTOR HAVING A METAL BELLOWS

(75) Inventor: Kevin T. Scarsdale, Bartlesville, OK (US)

(73) Assignee: Camco International Inc., Houston, TX (US)

( * ) Notice: Subject to any disclaimer, the term of this patent is extended or adjusted under 35 U.S.C. 154(b) by 0 days.

(21) Appl. No.: 09/268,631

(22) Filed: Mar. 15, 1999

Related U.S. Application Data

(60) Provisional application No. 60/078,169, filed on Mar. 16, 1998.

(51) Int. Cl.[7] .................................................. H02K 5/132
(52) U.S. Cl. .............................................. 310/87; 417/414
(58) Field of Search ............................... 310/87; 417/414; 277/379

(56) References Cited

U.S. PATENT DOCUMENTS

| | | | |
|---|---|---|---|
| 2,218,937 | * 10/1940 | Myers et al. | 310/87 |
| 2,293,616 | * 8/1942 | Myers | 310/87 |
| 3,475,634 | * 10/1969 | Bogdanov et al. | 310/87 |
| 4,421,999 | 12/1983 | Beavers et al. | 310/87 |
| 4,583,923 | * 4/1986 | James | 417/414 |
| 4,992,689 | * 2/1991 | Bookout | 310/87 |
| 5,011,166 | * 4/1991 | Watts | 277/88 |

FOREIGN PATENT DOCUMENTS

| | | | |
|---|---|---|---|
| 1080366 | 1/1994 | (CN) | F04D/13/08 |
| 60-032535 | 2/1985 | (JP) | H02K/5/132 |
| 01152940 | 6/1989 | (JP) | H02K/5/132 |

* cited by examiner

Primary Examiner—Nestor Ramirez
Assistant Examiner—Karl E. Tamai
(74) Attorney, Agent, or Firm—Fletcher, Yoder & Van Someren

(57) ABSTRACT

A downhole pumping system includes a downhole pump that is coupled to a downhole motor. The downhole motor includes a motor protector that utilizes one or more retractable and extensible bellows, instead of an elastomeric bag, to accommodate motor oil contraction and expansion.

20 Claims, 3 Drawing Sheets

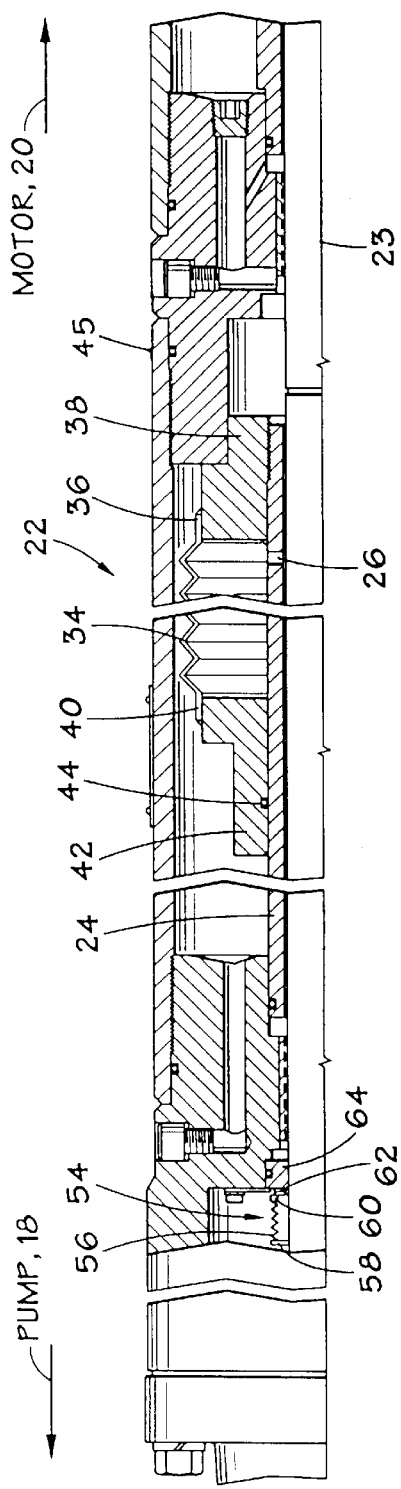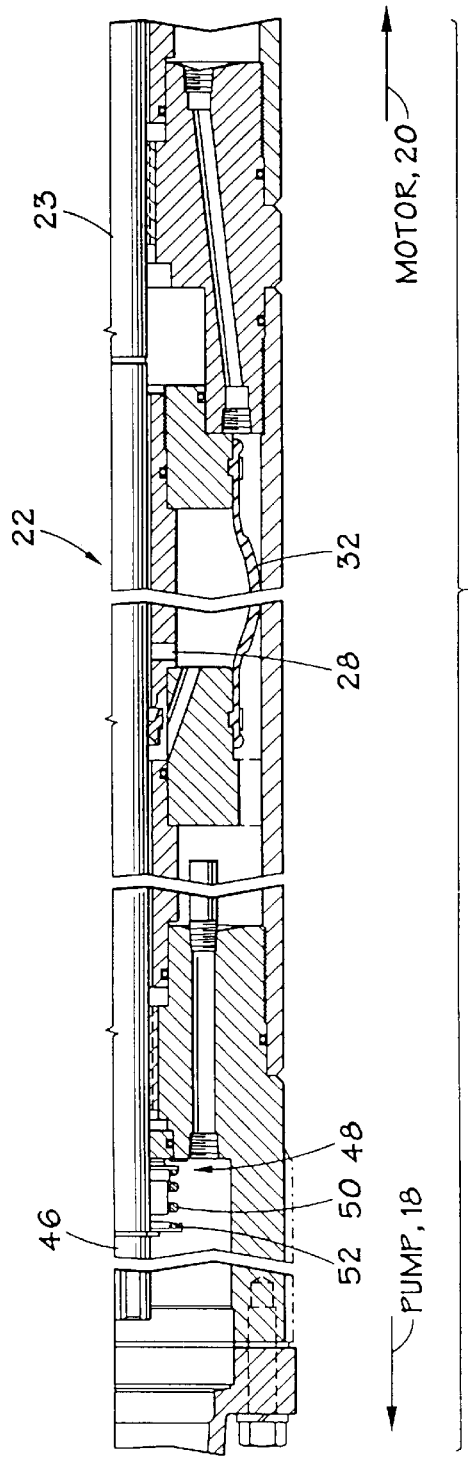
FIG. 2A
FIG. 2B
PRIOR ART

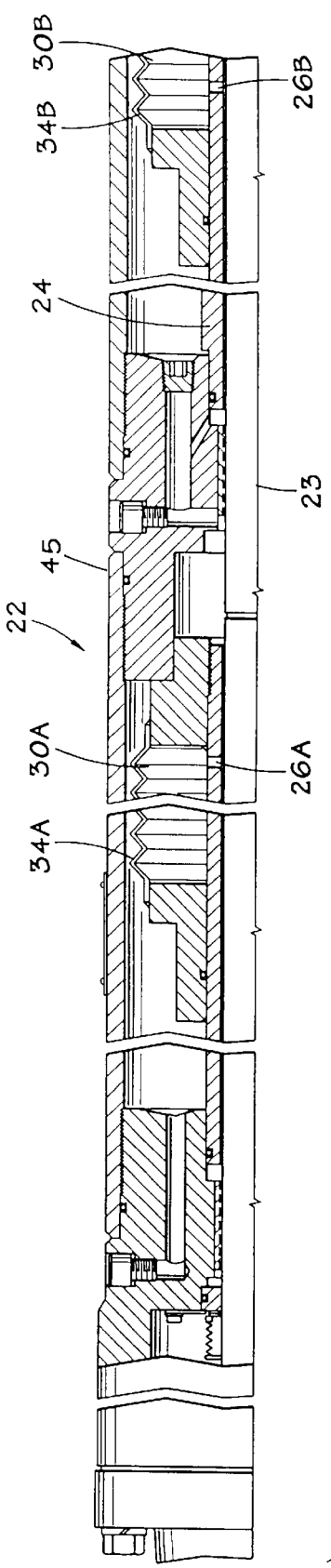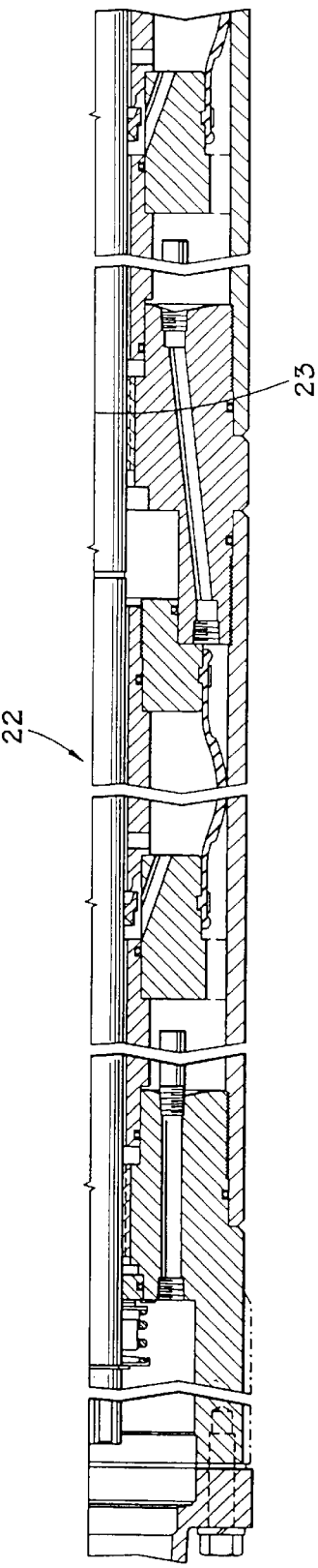
FIG. 3A
FIG. 3B PRIOR ART

SUBMERSIBLE PUMPING SYSTEM UTILIZING A MOTOR PROTECTOR HAVING A METAL BELLOWS

CROSS-REFERENCE TO RELATED APPLICATIONS

This application is a nonprovisional application of provisional application Ser. No. 60/078,169, filed on Mar. 16, 1998.

BACKGROUND OF THE INVENTION

1. Field of the Invention

The present invention relates generally to downhole pumping systems and, more particularly to a motor protector for use with a downhole pumping system.

2. Description of the Related Art

Electric submergible pumps are widely used throughout the world for recovering subterranean fluids to the earth's surface. For the long term successful operation of such submergible pumping systems, the electric motor is supplied with uncontaminated motor oil. The motor oil not only lubricates the motor, it also cools the motor to prevent overheating.

In most submergible pumping systems in use today, this motor oil is partially contained within a device commonly referred to as a motor protector. Conventional motor protectors typically include one or more elastomeric bags. These elastomeric bags provide two important functions: (1) equalizing the fluid pressure within the motor and (2) preventing well fluids and gases from contaminating the motor oil.

In regard to the first function, it should be understood that the temperature of the motor oil varies as a result of the intermittent operation of the submergible motor. As the temperature of the motor oil rises, for instance, the oil tends to expand and the pressure within the motor tends to increase. If the motor protector did not include an expandable member, such as the elastomeric motor protector bag, the internal pressure of the motor would increase dramatically. However, the motor protector bag expands and contracts to compensate for the varying liquid volume and to maintain a relatively constant pressure within the motor.

In regard to the second function, the motor protector bag provides a degree of isolation between the motor oil and the well fluids and gases. This isolation helps keep the motor oil clean to increase the longevity of the motor. Most elastomeric motor protector bags prevent many contaminants, such as crude oil, water, brine, and dirt, which may greatly reduce the life of the motor, from entering the motor.

As discussed above, in many applications elastomeric motor protector bags perform reasonably well. However, elastomeric bags suffer from several limitations. First, the repeated expanding and contraction of the elastomeric bag can cause the bag to split or crack under certain conditions. Of course, once an elastomeric bag splits or cracks it no longer protects the motor oil from contaminants which are then free to enter and ultimately damage the motor. Second, elastomeric bags tend to lose their elasticity due to various conditions which may be present in a wellbore. Once an elastomeric bag loses its elasticity, it can no longer expand and contract as needed to satisfy the requirements of the motor oil which it contains. Eventually the bag will rupture, leaving the contaminants free to attack the motor. Third, most elastomers cannot survive in environments where the temperature rises above about 400° F. Above that temperature, most elastomers become brittle causing the bag to break during expansion or contraction. Finally, elastomeric compounds currently used for motor protector bags tend to be relatively permeable as compared to the contaminants within the wellbore fluid. Many wells contain contaminants, such as hydrogen sulfide for instance, which will permeate the motor protector bag and attack the motor. In fact, certain contaminants, such as hydrogen sulfide, also tend to alter the chemistry of certain elastomers, causing the elastomers to harden. Once the elastomer has hardened, the bag eventually breaks.

In an effort to combat one or more these problems, the elastomeric material used to fabricate the motor protector bags have been studied and chosen to provide certain advantages. For instance, certain elastomers may slow the rate at which contaminants such as hydrogen sulfide enter the motor, but they cannot stop the permeation completely. Alternatively, certain elastomers may exhibit an ability to withstand temperatures as high as about 400° F., but these elastomers tend to have limited elasticity incompatible with the requirements of the motor.

The present invention may address one or more of the problems discussed above.

BRIEF DESCRIPTION OF THE DRAWINGS

The foregoing and other advantages of the invention will become apparent upon reading the following detailed description and upon reference to the drawings in which:

FIG. 2A illustrates a motor protector having a metal bellows in accordance with the present invention;

FIG. 2B illustrates a motor protector having an elastomeric bag

FIG. 3A illustrates a motor protector having multiple metal bellows in accordance with the present invention; and FIG. 3B illustrated a motor protector having multiple elastomeric bags.

DETAILED DESCRIPTION OF SPECIFIC EMBODIMENTS

Figure 1:
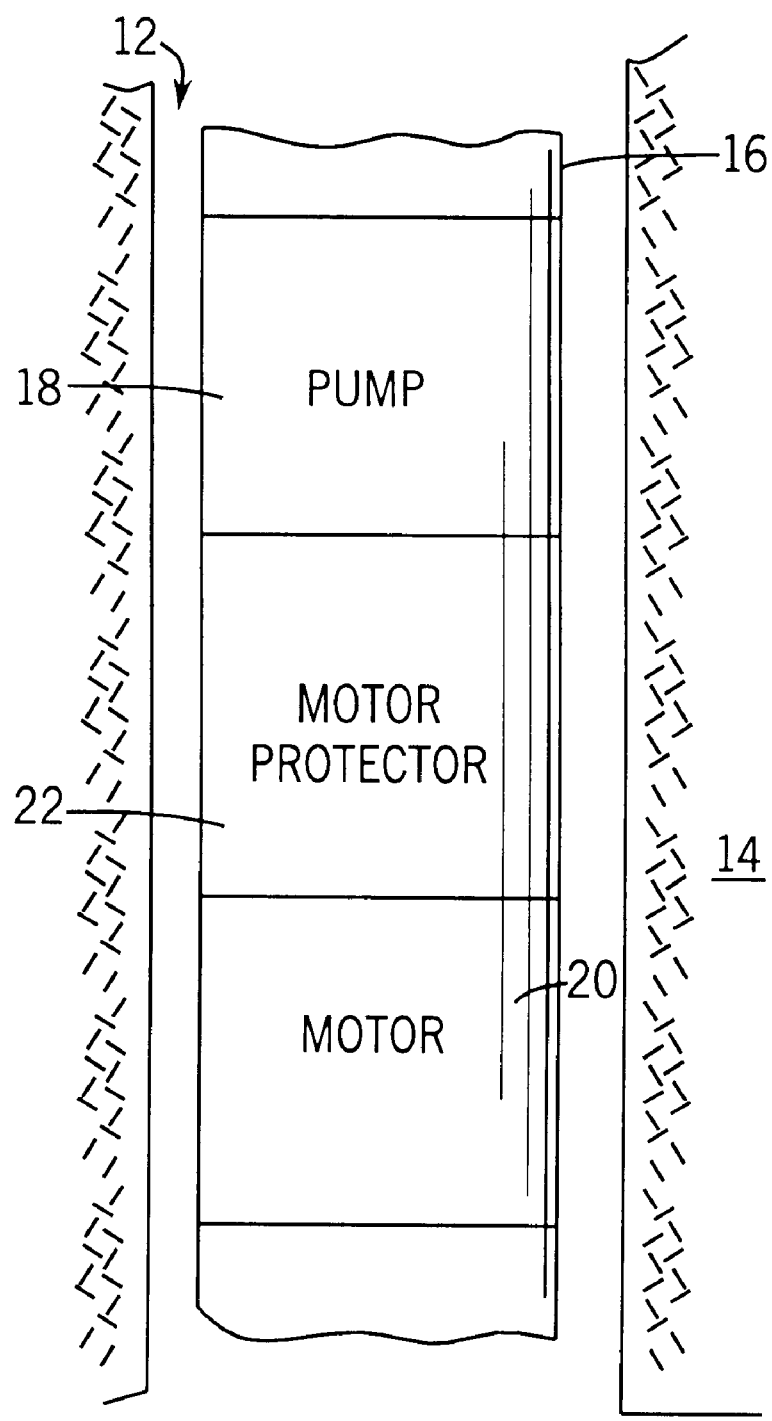
FIG 1. illustrates a submergible pumping system in accordance with the present invention.

Turning now to the drawings and referring initially to FIG. 1, a pumping system is illustrated and generally designated by a reference numeral 10. The pumping system 10 is shown located in a well bore 12 that has been created within a subterranean formation 14. Although not specifically illustrated, it is well known that the well bore 12 contains fluids and gases from the surrounding formation 14 and that the pumping system 10 is adapted to be submerged in these fluids and gases within the well bore 12.

The pumping system 10 is typically part of a production tubing string 16 and is responsible for pumping fluids and/or gases from the well bore 12 to the surface of the Earth. The pumping system 10 includes a pump 18 that is driven by a motor 20. The motor 20 is advantageously an electric motor. The motor 20 contains motor oil (not shown) which lubricates and cools the motor 20. A motor protector 22 is coupled to the motor 20. The motor protector 22 contains a portion of the motor oil, and it functions to keep the motor oil free from contaminants and to maintain a relatively constant pressure within the motor 20. Although the motor protector 22 is illustrated in this example as being coupled between the pump 18 and the motor 20, it should be understood that other arrangements may be suitable.

A detailed cross-sectional view of one embodiment of the motor protector 22 is depicted in FIG. 2A. However, before embarking on a discussion of the motor protector 22, it should be recognized that the embodiment of the motor protector 22 is illustrated above the longitudinal axis 23, a standard motor protector utilizing an elastomeric motor protector bag is illustrated below the longitudinal axis 23 for purposes of comparison. A drive shaft 24 runs through the center of the motor protector 22 and couples the motor 20 to the pump 18. Advantageously, the drive shaft 24 may be hollow to carry motor oil from the motor 20 into the motor protector 22. One or more ports 26 and 28 extend through the drive shaft 24 at selected locations to provide a fluidic communication path between the interior of the drive shaft 24 and an expansion/contraction chamber 30 which is defined by an expandable member.

In FIG. 2B, the expandable member that defines the chamber 30 is a conventional elastomeric motor protector bag 32. However, due to the various shortcomings described above, in this embodiment the elastomeric motor protector bag 32 has been replaced with a bellows 34 which defines the chamber 30. Like the elastomeric motor protector bag 32, the bellows 34 offers the advantages of expansion and contraction in response to thermal expansion and contraction of the motor oil within the drive shaft 24 and within the chamber 30. Thus, the motor 20 need not be constructed to withstand extraordinarily high pressures that would be present in a system that did not provide any pressure equalization device, such as an expandable member.

However, the bellows 34 offers additional advantages as well. First, the bellows 34 is advantageously fabricated from metal that is suitable for the environment in which the pumping system 10 is to be placed. In continuing with the example of a well bore environment that contains hydrogen sulfide, the bellows 34 may be fabricated from alloy 625, for example. Such stainless steel is not only resistant to the corrosive effects of the well bore fluids and gases, it is also impermeable to hydrogen sulfide, as well as most other fluids and gases found in typical well bore environments.

Second, because hydrogen sulfide cannot enter the motor oil through the metal bellows 34, scavengers need not be added to the motor oil. The lack of scavengers is advantageous for various reasons. For instance, motor oil additives, like scavengers, tend to increase the cost of the motor oil. Also, such additives typically reduce the effectiveness of the motor oil in performing its primary functions of cooling and lubricating the motor. Finally, it has been found that many such scavengers reduce the dielectric constant of the motor oil. In the event that insulation that protects windings and other conductors within the motor fails, a motor oil having a high dielectric constant is advantageous because it will reduce the likelihood of arcing between exposed conductors that may damage the motor.

Third, the metal bellows 34 can withstand greatly elevated temperatures as compared with the elastomeric motor protector bag 34. While a typical elastomeric motor protector bag may be able to operate relatively effectively in an environment where temperatures reach 300° F. to 400° F., the metal bellows 34 can operate effectively in an environment where temperatures exceed 600° F.

Unlike the elastomeric motor protector bag 32 that expands and contracts in a generally radial direction, the bellows 34 expands and contracts in a generally axial direction in response to the thermal expansion and contraction of the motor oil. Accordingly, the bellows 34 is advantageously coupled to at least one member that is capable of axial movement. In the illustrated example, one end 36 of the bellows 34 is coupled, e.g., by welding, to a stationary member 38, while the other end 40 of the bellows 34 is coupled, e.g., by welding, to a slidable member 42. The slidable member 42 may move axially along a portion of the exterior of the drive shaft 24 in response to expansion and contraction of the bellows 34.

To provide a seal between the slidable member 42 and the drive shaft 24, a suitable metal, ceramic, or any mechanical seal may be used. In the illustrated example, one or more O-rings 44 may be used. The O-rings 44 may be made of any material that is suitable for the environment in which the pumping system 10 is to be placed. However, in the continuing example of an environment that contains hydrogen sulfide, it may be advantageous to select O-rings made from KALREZ™, available from Dupont, which is an elastomer that demonstrates very little permeability to hydrogen sulfide.

The length of the bellows 34 and its range of movement is primarily dependent upon the amount of expansion and contraction desired for the particular motor application. In the illustrated example, the outer diameter of the pipe 45 that defines the outer casing of the motor protector 22 may be about 4.0 inches. The outer diameter of the bellows 34 may be about 3.5 inches, which is slightly less than the inner diameter of the pipe 45. The length of the bellows 34 may be up to about 24.0 inches without any supporting members, and its range of motion may be up to about 18.0 inches. If it is desirable to make the bellows 34 even longer, it may be advantageous to provide supports to prevent the bellows 34 from buckling during contraction.

It is also advantageous if all other seals that contain the motor oil are similarly resistant to the particular environment in which the pumping system 10 is to be placed. In the illustrated example, the end 46 of the drive shaft 24 that is coupled to the pump 18 uses a seal. Looking first at the lower portion of FIG. 2, it can be seen that a conventional seal 48 includes a spring-loaded seal 50 that is covered by a rubber boot 52. Clearly, in an environment that contains hydrogen sulfide, the conventional seal 48 would be quite permeable to this particular contaminant.

To address this shortcoming, the embodiment illustrated in FIG. 2A includes a seal 54 that is not permeable to hydrogen sulfide. The seal 54 may be a mechanical seal fabricated using a small metal bellows 56, for instance. One end 58 of the metal bellows 56 is coupled, e.g., by welding, to the drive shaft 24, while the other end 60 of the metal bellows 56 is coupled to a ceramic bearing seal 60 that mates with a ceramic bearing seal 62 located on a stationary member 64. Thus, the seal 54 may rotate with the drive shaft 24. Also, the seal 54 offers the advantages discussed above with regard to the metal bellows 34.

It should also be appreciated that more than one bellows 34 may be used. For example, as illustrated in FIG. 3A, a first expansion/contraction chamber 30A may be defined by a first bellows 34A, and a second expansion/contraction chamber 30B may be defined by a second bellows 34B. In this embodiment, each chamber 30A and 30B is in direct fluidic communication with the interior of the drive shaft 24 by virtue of the respective ports 26A and 26B. Thus, the bellows 34A and 34B tend to expand and contract simultaneously in response to thermal expansion and contraction of the motor oil.

While the invention may be susceptible to various modifications and alternative forms, specific embodiments have been shown by way of example in the drawings and have been be described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A motor protector comprising:

a casing coupled between a downhole pump and a downhole motor;

a first chamber defined within the casing, the first chamber having a driveshaft extending therethrough and a first fluid port adapted to couple the first chamber to fluid within the downhole motor;

a first slidable member axially slidable along the driveshaft;

a first mechanical seal mounted around the first slidable member and disposed between the first slidable member and the driveshaft; and a first bellows disposed in the first chamber around a portion of the driveshaft to retain the fluid, the first bellows having a first end and a second end, the first end of the first bellows being coupled to a first stationary member and the second end of the first bellows being coupled to the first slidable member, the second end of the first bellows and the first slidable member being moveable axially along the driveshaft within the first chamber in response to pressure of the fluid within the first bellows.

2. The motor protector, as set forth in claim 1, wherein the first bellows prevents hydrogen sulfide from migrating into the fluid through the first bellows.

3. The motor protector, as set forth in claim 2, wherein the first bellows comprises alloy 625 stainless steel.

4. The motor protector, as set forth in claim 1, wherein the seal comprises an O-ring disposed about the first slidable member.

5. The motor protector, as set forth in claim 1, wherein the motor protector operates effectively at temperatures above 600° F.

6. The motor protector, as set forth in claim 1, wherein the first chamber comprises an annular chamber and wherein the first bellows comprises annular bellows.

7. The motor protector, as set forth in claim 1, comprising:

a second chamber defined within the casing, the second chamber having a second fluid port adapted to couple the second chamber to the fluid;

a second bellows disposed in the second chamber to retain the fluid, the second bellows having a first end and a second end, the first end of the second bellows being coupled to a second stationary member and the second end of the second bellows being coupled to a second slidable member, the second end of the second bellows being axially slidable within the second chamber in response to pressure of the fluid within the second bellows.

8. A motor protector comprising:

a casing adapted to be operatively coupled to a downhole motor;

a first chamber defined within the casing, the first chamber having a driveshaft extending therethrough and a first fluid port adapted to couple the first chamber to fluid within the downhole motor;

a first slidable member axially slidable along the driveshaft;

a first mechanical seal mounted around the first slidable member and disposed between the first slidable member and the driveshaft;

a first bellows disposed in the first chamber around a portion of the driveshaft to retain the fluid, the first bellows having a first end and a second end, the first end of the first bellows being coupled to a first stationary member and the second end of the first bellows being coupled to the first slidable member, the second end of the first bellows and the first slidable member being moveable axially along the driveshaft within the first chamber in response to pressure of the fluid within the first bellows;

a second slidable member axially slidable along the driveshaft;

a second mechanical seal mounted around the second slidable member and disposed between the second slidable member and the driveshaft; and a second bellows disposed in the second chamber to retain the fluid, the second bellows having a first end and a second end, the first end of the second bellows being coupled to a second stationary member and the second end of the second bellows being coupled to the second slidable member, the second end of the second bellows and the second slidable member being moveable axially along the driveshaft within the second chamber in response to pressure of the fluid within the second bellows.

9. The motor protector, as set forth in claim 8, wherein the first and second bellows prevent hydrogen sulfide from migrating into the fluid through the first and second bellows.

10. The motor protector, as set forth in claim 9, wherein the first and second bellows comprise alloy 625 stainless steel.

11. The motor protector, as set forth in claim 8, wherein the first seal comprises a first O-ring disposed about the first slidable member, and wherein the second seal comprises a second O-ring disposed about the second slidable member.

12. The motor protector, as set forth in claim 8, wherein the motor protector operates effectively at temperatures above 600° F.

13. The motor protector, as set forth in claim 8, wherein the first chamber comprises a first annular chamber and wherein the first bellows comprises a first annular bellows, and wherein the second chamber comprises a second annular chamber and wherein the second bellows comprises a second annular bellows.

14. A downhole pumping system comprising:

a downhole pump;

a downhole motor drivingly coupled to the downhole pump;

a motor protector, disposed between the downhole motor and the downhole pump, drivingly coupled to the downhole motor, the motor protector comprising:

a casing having a driveshaft extending therethrough;

a first chamber defined within the casing, the first chamber having a first fluid port adapted to couple the first chamber to fluid within the downhole motor;

a first slidable member axially slidable along the driveshaft;

a first mechanical seal mounted around the first slidable member and disposed between the first slidable member and the driveshaft; and a first bellows disposed in the first chamber around a portion of the driveshaft to retain the fluid, the first bellows having a first end and a second end, the first end of the first bellows being coupled to a first stationary member and the second end of the first bellows being coupled to the first slidable member, the second end of the first bellows being axially slidable within the first chamber in response to volume of the fluid within the first bellows.

15. The system, as set forth in claim 14, wherein the first bellows forms a barrier to hydrogen sulfide.

16. The motor protector, as set forth in claim 15, wherein the first bellows comprises alloy 625 stainless steel.

17. The system, as set forth in claim 14, wherein the seal comprises an O-ring disposed about the first slidable member.

18. The system, as set forth in claim 14, wherein the motor protector operates effectively at temperatures above 600° F.

19. The system, as set forth in claim 14, wherein the first chamber comprises an annular chamber and wherein the first bellows comprises an annular bellows.

20. The system, as set forth in claim 14, comprising:

a second chamber defined within the casing, the second chamber having a second fluid port adapted to couple the second chamber to the fluid;

a second slidable member axially slidable along the driveshaft;

a second seal disposed between the second slidable member and the driveshaft; and a second bellows disposed in the second chamber to retain the fluid, the second bellows having a first end and a second end, the first end of the second bellows being coupled to a second stationary member and the second end of the second bellows being coupled to the second slidable member, the second end of the second bellows and the second slidable member being moveable axially along the driveshaft within the second chamber in response to pressure of the fluid within the second bellows.

* * * * *